United States Patent

[11] 3,582,125

[72] Inventor John J. Collins
1218 Quest Drive, Apt. 2, Louisville, Ky. 40213
[21] Appl. No. 851,173
[22] Filed Aug. 19, 1969
[45] Patented June 1, 1971

[54] TIRE SLING FOR HEAVY EQUIPMENT TIRES
8 Claims, 9 Drawing Figs.

[52] U.S. Cl. ................................................ 294/74, 254/167
[51] Int. Cl. .................................................. B66c 1/12
[50] Field of Search ................................ 294/74, 75, 78, 82, 83; 287/52.05, 52.07; 254/65, 188, 167; 24/116; 214/1—R.2, 1—R.3

[56] References Cited
UNITED STATES PATENTS
2,014,201 9/1935 Field ........................... 294/74
2,919,949 1/1960 Caldwell ...................... 294/74

Primary Examiner—Harvey C. Hornsby
Assistant Examiner—Johnny D. Cherry
Attorneys—A. Yates Dowell and A. Yates Dowell, Jr ABSTRACT: Apparatus including a pair of chain-type pulleys each having a sling rotatably mounted on a chain sheave which can be freely rotated or locked in nonrotating position selectively.

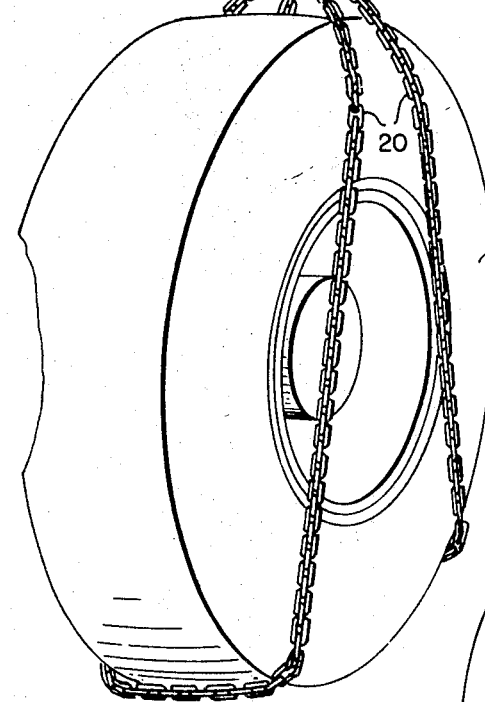
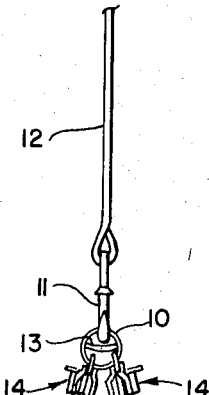
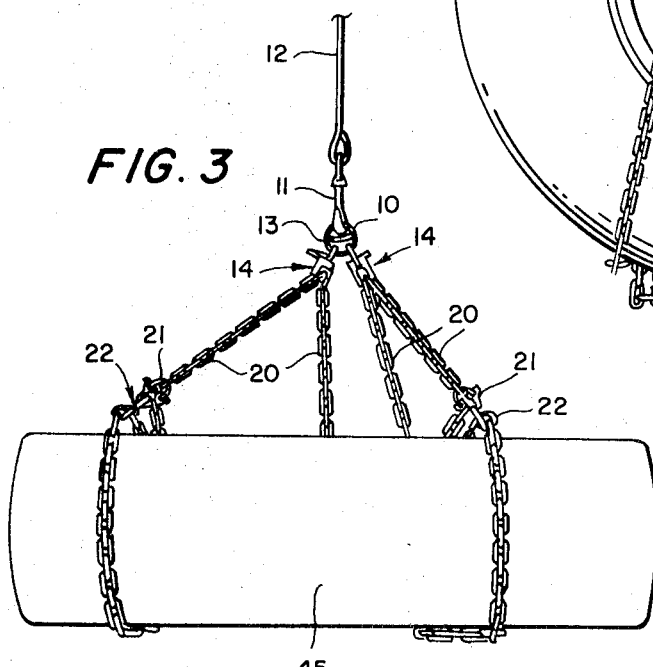
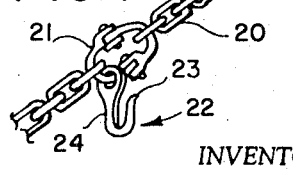

PATENTED JUN 1 1971
3,582,125
SHEET 2 OF 2
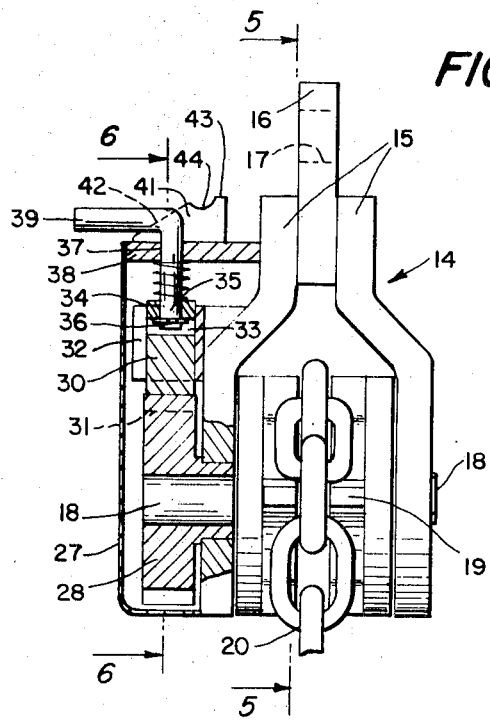
FIG. 4
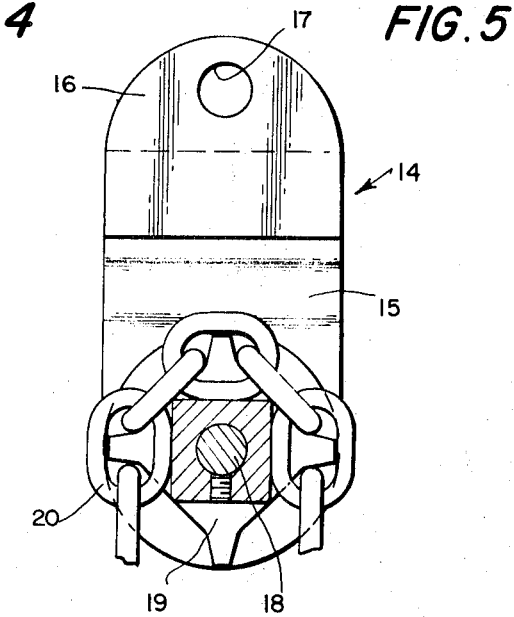
FIG. 5
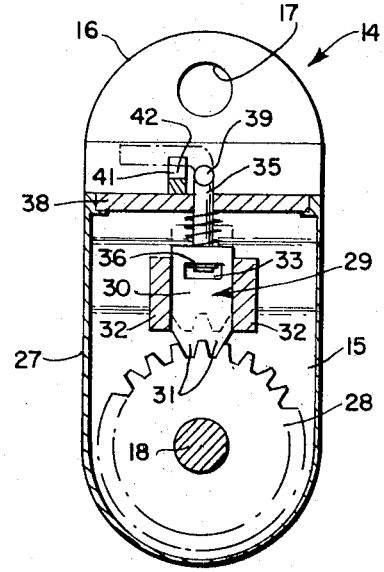
FIG. 6
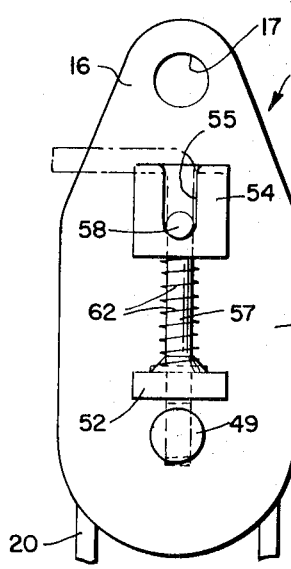
FIG. 8
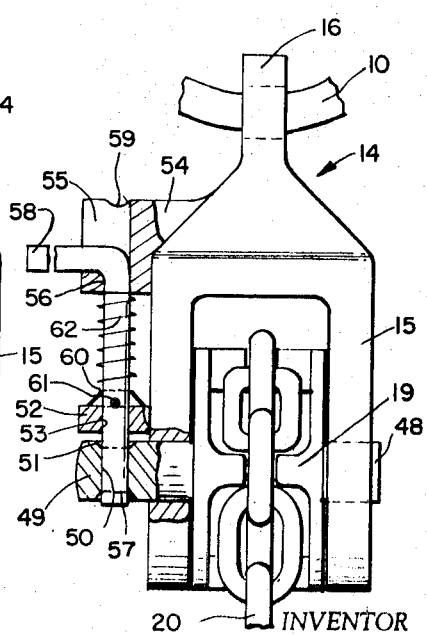
FIG. 9
INVENTOR
JOHN J. COLLINS
BY 
ATTORNEY

TIRE SLING FOR HEAVY EQUIPMENT TIRES

BACKGROUND OF THE INVENTION

1. Field of the Invention

This invention relates generally to the repair and removal of tires from heavy equipment and relates particularly to apparatus adapted to engage a tire and which can be used to remove and replace heavy equipment tires in the field or in a shop and which eliminates most of the hand labor involved. When the tire is free of the vehicle, it can be supported in any desired plane.

2. Description of the Prior Art

Heretofore the repair and replacement of heavy equipment tires has been a tedious and time consuming job which normally is accomplished only in well-equipped shops due primarily to the size of the tires involved which may be as large as 10 feet to 12 feet in diameter and may weigh several thousand pounds. In a well-equipped shop an overhead chain hoist usually is available; however, if the changing of a tire in the field has been necessary, it has involved much manual labor by several persons and has taken a considerable length of time. Even in well-equipped shops the overhead chain hoists have not been able to control the attitude or angular position of the tire.

Some efforts have been made to provide load-handling slings which were adjustably mounted on sheaves and some of these devices had means for locking the same against rotation, while others had self-equalizing means, and in some instances had mechanisms for manually rotating the sheaves. These devices have not been entirely satisfactory because most of the prior art devices have not provided means permitting free rotation of the sling and in the cases where free rotation was possible they either lacked a means for locking the same in fixed position or the means for locking the sheave was complicated and sometimes dangerous to use and was not positive in its operation.

SUMMARY OF THE INVENTION

The present invention is a tire sling for heavy equipment tires which includes a pair of slings of the chain-link-type each of which engages a sheave carried by a yoke member with the pair of yoke members being mounted on a common ring engageable by the hook on the end of the boom of a service repair truck or by an overhead hoist. In one embodiment, each of the sheaves is mounted on a freely rotatable shaft having a gear or sprocket mounted thereon and disposed within a housing on the side of the yoke. A toothed locking member is slidably mounted within the housing and is mountable in a first position out of engagement with the gear to permit free rotation of the sheave, and in the second position the toothed member will engage the gear and prevent rotation of the sheave. In another embodiment, each of sheaves is mounted on a freely rotatable shaft having a bore normal to the axis thereof and a spring urged locking member selectively extended into or retracted from the bore to lock the shaft or permit free rotation thereof.

It is an object of the invention to provide a tire sling for heavy equipment tires with such sling having a pair of link-type chain slings each of which is carried by a sheave mounted on a shaft within a housing and providing means for selectively locking each sheave in fixed position or permitting free rotation thereof.

Another object of the invention is to provide a tire sling having a pair of chain-link-type slings each of which is carried by a sheave mounted on a shaft within a housing and having a gear mounted on the same shaft which is selectively engageable by a toothed locking mechanism easily accessible from the exterior of the housing and which can be easily moved to locked or unlocked positions.

BRIEF DESCRIPTION OF THE DRAWINGS

FIG. 1 is a perspective illustrating one application of the invention.

FIG. 2 is a side elevation with the tire in a generally vertical position.

FIG. 3 is a side elevation with the tire in a generally horizontal position.

FIG. 4 is an enlarged side elevation of the housing containing the chain sheave and locking mechanism with portions broken away for clarity.

FIG. 5 is a vertical section on the line 5-5 of FIG. 4.

FIG. 6 is a vertical section on the line 6-6 of FIG. 4.

FIG. 7 is an enlarged perspective illustrating the connected ends of the chain sling.

FIG. 8 is a side elevation of a modified form of the housing and illustrating a modified locking mechanism.

FIG. 9 is an end elevation of the structure of FIG. 8 with portions broken away for clarity.

DESCRIPTION OF THE PREFERRED EMBODIMENTS

With reference to the drawings, the tire sling of the present invention includes a ring 10 adapted to be engaged by a hook 11 carried at one end of a cable 12. The cable 12 may be supported from any desired structure (not shown) including the boom of a tire repair vehicle, an overhead crane, or the like. The ring 10 may be open or, as illustrated in FIGS. 1—3, such ring may have a limiting brace or member 13 welded or otherwise attached to opposite sides of the inner periphery to divide the ring into two separate attachment areas. The hook 11 is received within one of the areas and a pair of chain pulleys 14 are disposed within the other area.

Each of the chain pulleys includes a yoke having a pair of spaced side members 15 connected at one end by an intermediate tongue 16. The tongue 16 has an opening 17 adjacent to one end of a size slightly larger than the cross-sectional diameter of the ring 10 and is adapted to slidably receive such ring therein. A shaft 18 extends between and is rotatably supported by the side members 15 and such shaft is attached to a chain-type sheave 19 rotatably supported between such side members. The sheave 19 is adapted to receive a link-type chain 20 the opposite ends of which are connected by a ring or chain connector 21 to provide a close loop of chain. As illustrated in FIG. 7, the chain connector 21 has a chain hook 22 mounted thereon. The bill 23 of chain hook 22 is spaced from the shank portion 24 a distance slightly greater than the thickness of one of the links of the chain and is adapted to receive one of the links therein so that the loop formed by the chain can be shortened to any desired size.

As illustrated in FIGS. 4—6, at one side of each of the chain pulleys 14 the shaft 18 extends outwardly beyond the side member 15 into a housing 27 carried thereby. A gear or toothed wheel 28 is mounted on the shaft 18 within the housing 27 and such gear is adapted to be selectively engaged by a sliding pawl or lock member 29. The pawl includes a body 30 having one or more teeth or projections 31 on one end of a size to cooperatively engage the teeth of the gear 28.

In order to selectively move the pawl 29 into and out of engagement with the gear 28, a pair of spaced guides 32 are located within the housing 27 and such guides are adapted to slidably engage opposite sides of the body 30. At the end of the body 30 opposite the teeth 31, a slot or recess 33 extends substantially entirely through such body from front to back and a generally cylindrical bore or opening 34 extends from the end of the body to the slot 33. A generally cylindrical pin 35 is rotatably mounted within the bore 34 and such pin may have an annular recess adjacent to one end for the reception of a snapring 36 located within the slot 33 and adapted to prevent withdrawal of the pin from the bore while permitting rotation thereof. The pin 35 extends upwardly through an opening 37 in the top 38 of the housing 27 and then is bent substantially at a right angle, as illustrated in FIG. 4, to provide a handle or operating portion 39. A spring 40 is located about the pin 35 between the top of the body 30 and the bottom surface of the housing top 38 and is adapted to apply a downward pressure to the body at all times.

On the upper surface of the top 38 at least one lug 41 is provided and such lug includes a tapered cam surface 42 terminating in a flattened top 43 having an arcuate recess 44 therein. When the teeth 31 of the body are in cooperative engagement with the gear 28, the handle or operating portion 39 of the pin 35 extends outwardly generally parallel with the shaft 18. However, if it is desired to move the teeth 31 out of engagement with the gear, the handle 39 is rotated toward the lug 41 where it will engage the tapered cam surface 42. Continued rotation of the handle in the same direction will cause the same to ride up the cam surface and raise the body 30 against the tension of the spring 40. When the handle of the pin reaches the flattened top 43 of the lug, such handle will be received within the arcuate recess 44 to lock the pin in fixed position. In this position the teeth 31 are out of engagement with the gear 28 and therefore the gear 28 and the sheave 19 are freely rotatable.

In the operation of this modification, when a tire 45 of a heavy equipment vehicle is to be repaired or replaced, the upper compartment of the ring 10 is positioned on the hook 11 and moved to a position adjacent to the tire. The chain 20 of one of the chain pulleys 14 is then passed around the tire 45 at an angle to a vertical plane and the chain hook 22 is adjusted to take up most of the slack in the loop. Thereafter the chain 20 of the other chain pulley is passed around the tire at an angle to a vertical plane which is substantially complementary to the first chain and the chain hook 22 is adjusted to a position substantially corresponding to the chain hook of the first chain. In this position the pawl or lock member 29 normally will be unlocked or in the raised position with the handle 39 of the pin 35 being located within the arcuate recess 44. After the chains are in position, the hook 11 is raised to apply a strain to support the tire 45 while the rim is being removed from the hub of the vehicle. After the rim is removed from the hub, the hook 11 is raised further so that the tire is out of engagement with the ground or floor so that the tire can be moved to a different location. The hook 11 then is lowered to permit the tire to engage the ground or floor and continued lowering of the hook will cause the tire to tilt to one side. During this tilting movement the chains 20 are freely movable through the chain pulleys 14 to permit the tire to be lowered to a generally horizontal position so that the rim can be removed. If the tire 45 is to be transported a substantial distance by the hook 11, the handle 39 is removed from the arcuate recess and moved to a position where the handle extends outwardly of the housing 27. In this position the spring 40 moves the body 30 downwardly until the teeth or projections 31 engage the gear 28 to prevent rotation of the gear and to lock the chain sheave 19 in fixed position.

In some instances the tire is removed from the rim while the rim remains on the hub of the vehicle. In this case the chains are placed around the tires as before and usually the pawl 29 is in engagement with the gear 28 to lock the gear against rotation while the tire is removed from the rim and carried to a location remote from the vehicle. Thereafter the chains are removed from the tire and placed on a new tire which is then carried back to the vehicle and installed.

With reference to FIGS. 8 and 9, a modified form of the sheave block mechanism is disclosed in which each of the chain pulleys 14 includes a shaft 48 rotatably mounted within the side members 15 and has a portion 49 extending outwardly a substantial distance beyond one of the sides 15. The outwardly extending portion 49 includes a bore 50 disposed diametrically of the shaft 48 and such bore includes a countersunk portion 51 at each end. A lug 52 is welded or otherwise attached to the side member 15 and such lug is located above the outwardly extending portion 49 of the shaft 48. The lug 52 is provided with an opening 53 generally in alignment with the bore 50.

An enlargement 54 is spaced above the lug 52 and such enlargement includes a recess 55 located generally parallel with the axis of the shaft 48. An opening 56 extends upwardly from the bottom of the enlargement 54 into the recess 55 and such opening is in axial alignment with the opening 53 in the lug 52. A locking pin 57 having an outwardly bent operating portion 58 is slidably received in the openings 53 and 56 and such pin is of a length to extend into the bore 50 when the operating portion 58 is located within the recess 55 and to be retracted from the bore 50 when the operating portion 58 is located within a recess 59 in the upper surface of the enlargement 54.

In order to urge the locking pin 57 downwardly into the bore 50, a skirt or collar 60 is connected to the pin 57 in any desired manner, as by a roll pin 61 or the like. A spring 62 is disposed between the upper portion of the collar 60 and the lower portion of the enlargement 54 so that it will apply a downward pressure to the locking pin 57 at all times.

In the operation of this modification, when the locking pin 57 is in raised position with the operating portion 58 generally parallel to the side member 15 and received within the recess 59, the lower portion of such locking pin will be retracted from the bore 50 and the shaft 48 is freely rotatable. When it is desired to lock the shaft against further rotation, it is necessary only to move the operating portion 58 into alignment with the recess 55 so that the spring 62 will urge the locking pin 57 downwardly. If the bore 50 is in alignment with the locking pin 57, the pin will enter the bore and lock the shaft against rotation. If the bore is not in alignment, the pin will engage the surface of the shaft 48 so that when the shaft rotates no more than half of one revolution, the bore 50 will move into alignment with the locking pin at which time the spring 62 will drive the pin into the bore and lock the shaft. When it is again desired to rotate the shaft 48, it is only necessary to raise the pin 57 against the tension of the spring 62 until the operating portion 58 is above the enlargement 54 and then rotate such operating portion approximately 90° so that it rests within one of the recesses 59.

I claim:

1. A tire sling for repairing and replacing heavy equipment tires comprising a ring member, a pair of chain pulleys carried by said ring member, each of said chain pulleys including a yoke having a housing on one side, a shaft rotatably carried by said yoke, a chain type sheave mounted on said shaft between the sides of said yoke, a toothed wheel mounted on said shaft within said housing, a lock member slidably mounted within said housing, said lock member having projections on one end which are cooperatively engageable with the teeth of said toothed wheel, means for moving said lock member selectively into and out of engagement with said toothed wheel, and chain means carried by said chain type sheave, whereby said chain type sheave selectively is freely rotatable or locked in fixed position by movement of said lock member.

2. The structure of claim 1, in which said means for moving said lock member includes a pin means rotatably carried by said lock member, said pin means having an operating handle adapted to selectively engage a lug having a tapered cam surface for selectively raising and lowering said lock member.

3. A tire sling for repairing and replacing heavy equipment tires comprising a support member engageable with a lifting mechanism, a pair of chain pulleys slidably mounted on said support member, each of said chain pulleys including a freely rotatable shaft means, yoke means rotatably mounting said shaft means, chain type sheave means mounted on said shaft intermediate the sides of said yoke means, gear means mounted on said shaft exteriorly of said yoke means, a lock member slidably carried by said yoke means substantially in alignment with said gear means, said lock member having portions cooperatively engageable with said gear means, selectively operable means for moving said lock member into and out of engagement with said gear means, and chain means carried by said chain type sheave means, whereby said chain means is selectively locked in fixed position or freely movable through said chain pulleys.

4. The structure of claim 3, in which said means for moving said lock member includes pin means rotatably connected to said lock member and having an operating portion extending outwardly thereof, lug means carried by said yoke means and having an inclined surface engageable by said pin-operating means, whereby movement of said operating means up said inclined surface will move said lock member out of engagement with said gear means.

5. The structure of claim 4, including spring means for moving said lock member into cooperative engagement with said gear means when said operating means is removed from said tapered surface.

6. A tire sling for repairing and replacing heavy equipment tires comprising a ring member, a pair of chain pulleys carried by said ring member, each of said chain pulleys including a yoke having a shaft rotatably mounted therein, a chain type sheave mounted on said shaft between the sides of said yoke, at least one end of said shaft extending outwardly beyond said yoke, locking pin means mounted on said yoke in alignment with said outwardly extending portion of said shaft, lock means on said shaft selectively engageable with said locking pin means to permit or prevent free rotation of said shaft, resilient means normally urging said locking pin means toward engagement with the lock means on said shaft, and chain means carried by said chain type sheave and adapted to be placed about a heavy equipment tire, whereby said ring member can be raised to support a heavy duty tire and said chain type sheaves are selectively freely rotatable or locked in fixed position by movement of said lock pin means.

7. The structure of claim 6 in which said shaft lock means includes an opening of a size to receive said locking pin.

8. The structure of claim 6 in which said shaft lock means includes gear means mounted on the outwardly extending portion of said shaft, and said locking pin includes at least one projection cooperatively engageable with said gear means.